United States Patent

[11] 3,615,664

| [72] | Inventor | Leo H. Francis |
| | | Burlingame, Calif. |
| [21] | Appl. No. | 878,972 |
| [22] | Filed | Dec. 5, 1969 |
| [45] | Patented | Oct. 26, 1971 |
| [73] | Assignee | Foremost-McKesson, Inc. |
| | | San Francisco, Calif. |
| | | Continuation-in-part of application Ser. No. 480,068, Aug. 16, 1965, now abandoned, Continuation-in-part of application Ser. No. 521,116, Jan. 17, 1966, now abandoned, Continuation-in-part of application Ser. No. 624,306, Mar. 20, 1968, now abandoned, Continuation of application Ser. No. 733,965, May 31, 1968, now abandoned. The portion of the term of the patent subsequent to June 3, 1986, has been disclaimed. |

[54] TREATMENT OF WHEY
3 Claims, 1 Drawing Fig.

[52] U.S. Cl. ...................................... 99/57,
99/203, 204/180 P
[51] Int. Cl. ...................................... A23c 21/00
[50] Field of Search ............................. 99/57, 203;
204/180 P

[56] References Cited
UNITED STATES PATENTS

| 2,631,100 | 3/1953 | Aten et al. ................. | 99/57 |
| 3,166,486 | 1/1965 | Hull........................... | 99/57 X |
| 3,325,389 | 6/1967 | Patsi et al. ................. | 204/180 |

*Primary Examiner*—Lionel M. Shapiro
*Assistant Examiner*—D. M. Naff
*Attorney*—Flehr, Hohbach, Test, Albritton & Herbert

ABSTRACT: Liquid whey is subjected to concentration, crystallization of lactose and removal of lactose crystals. The resulting whey is clarified and electrodialyzed. It can be sold or used in liquid form, or may be further concentrated and dried to make a demineralized dry product with a reduction in ash content of at least 15 percent.

PATENTED OCT 26 1971
3,615,664
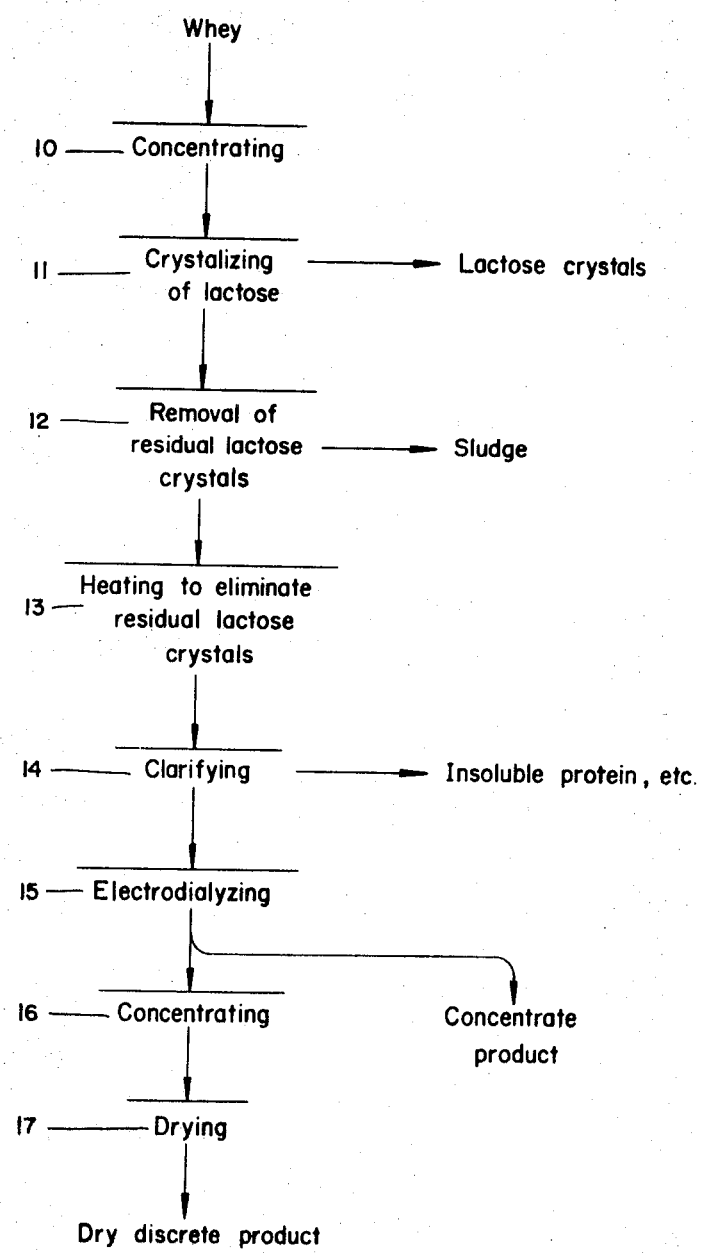
INVENTOR.
LEO H. FRANCIS
BY Flehr, Hohbach, Test,
Albritton & Herbert
ATTORNEYS

TREATMENT OF WHEY

This application is a continuation in part of my copending application Ser. No. 480,068 filed Aug. 16, 1965, copending application Ser. No. 521,116 filed Jan. 17, 1966, and copending application Ser. No. 624,306 filed Mar. 20, 1968, and a continuation of copending application Ser. No. 733,965 filed May 31, 1968, for "Whey Product and Process of Manufacture", all now abandoned.

This invention relates generally to the manufacture of food products containing whey solids and to methods for their manufacture.

It is well known that liquid whey produced in various manufacturing processes contains valuable food constituents. The processing of such liquid whey to form edible food products involves a number of problems. The mineral salt content is higher than desired for normal food products, and imparts undesirable flavor characteristics, and, when partially delactosed, may contain nutritionally deleterious levels of salts of monovalent cations when used at otherwise desirable levels in foods. When it is attempted to reduce the mineral salt content by conventional methods such as ion exchange resins or electrodialysis, various difficulties are encountered. Ion exchange resins columns tend to become clogged with insoluble precipitated protein. This requires frequent shutdown for cleaning, which greatly increases cost of operation. When unconcentrated whey is subjected to electrodialysis in conventional electrodialyzing equipment involving the use of membrane stacks, the very low concentration of solids limits capacities severly because of (1) the high volume of liquid that must be passed through the equipment, and (2), the relatively low conductivity of fluid whey when compared to whey concentrated to about 20-30 percent solids. The capacity limitations are markedly overcome by concentrating the whey to levels approaching 30 percent solids, if means can be provided for controlling viscosity and the tendency actually to gel with resulting excessive pressure drop taking place in the membrane stacks and actual clogging of the flow paths between the membranes.

The above difficulties are particularly noticeable when the source material is a high heat concentrated whey. High heat whey is one which in its treatment is heated to elevated temperatures for a period of time sufficient to cause significant denaturation of whey protein. For example, the raw whey may be heated to 165° F. or higher and held at such temperature level for 1 minute or longer to produce medium heat or high heat whey. A low heat whey is one processed in such a manner as to minimize denaturation of the protein. For example, it may be heated to a temperature of 165° F. and held at that temperature for a period of 15 to 30 seconds, or it may be treated at lower temperatures (e.g. 130°-165° F.) and holding times which may extend beyond 15 to 30 seconds but without significant denaturation of the protein. Assuming that the heat treatment is preliminary to concentration by evaporation, the retention of low heat characteristics requires an evaporating process which of itself or in conjunction with pretreatment, does not cause substantial denaturation of protein. Thus a high velocity downdraft multiple effect evaporation of the Peebles type (U.S. Pat. No. 2,090,985) may be used with the first effect having a jacket or shell temperature of about X 165° F. or less and with the retention time through the several effects (e.g., four effects) being such as to avoid significant denaturation of protein. Comparable results can be obtained by use of an updraft vacuum evaporator provided the number of effects is limited (e.g., to three effects) to avoid protein denaturing.

In addition to the foregoing, the protein content of whey is generally lower than is desired. A reduction therefore in lactose content, as by conventional crystallization methods, results in a delactosed whey that is higher in protein content but also higher in mineral content, the composition of which gives rise to poor drying characteristics as well as to nutritional disadvantages.

I have found that the difficulties encountered in the demineralizing of high heat delactosed whey concentrate by electrodialysis can be greatly alleviated by first removing a substantial portion of the lactose present, or, in other words, by applying electrodialysis to delactosed whey. Also I have found that by proper treatment of whey prior to electrodialysis, including removal of a substantial portion of the lactose present, electrodialysis can be successfully applied to produce new and valuable food products from both high heat and low heat wheys having high protein content along with uniquely adjusted salt contents.

In general, it is an object of the present invention to provide a novel demineralization for the manufacture of valuable food products from whey.

Another object of the invention is to provide a process which makes possible the demineralization of high heat whey.

Another object of the invention is to provide a process which can be applied to low heat delactosed whey concentrate for the manufacture of products having their protein content substantially undenatured and with the mineral content preferentially altered both in gross quantity and in relative content of sodium and potassium compared to calcium.

Another object of the invention is to provide a process of the above character which utilizes electrodialysis in conjunction with pretreatment, including solids concentration and pH control, of the liquid in which some lactose and certain insoluble solids are removed.

Another object of the invention is to provide whey processing steps which will improve the drying characteristics of the material.

Another object of the invention is to provide novel concentrates and dry products resulting from the foregoing process.

Additional objects and features of the invention will appear from the following description in which the preferred embodiment of the invention has been disclosed in detail in conjunction with the accompanying drawing.

The whey employed as source material for my process is most commonly derived from the manufacture of cheese such as cheddar cheese or cottage cheese whey. Cottage cheese whey normally has a titratable acidity of the order of 0.5 to 0.6 percent (expressed as lactic acid). The acidity of cheddar cheese whey may be of the order of from 0.12 to 0.30 percent. The ash content of cottage cheese whey may be of the order of from 10.0 to 11.5 percent (dry solids basis), and that of cheddar cheese whey from about 8.5 to 9.0 percent. It may be either high heat or low heat whey, depending upon the character of heat treatment to which it may have been subjected.

Referring to the flow sheet of the accompanying drawing, the first step 10 of my process is to concentrate the raw liquid whey preparatory to removing a substantial part of the lactose content. Concentration may be carried out by vacuum evaporation to from 50 to 60 percent solids, after which lactose is permitted to crystallize in step 11, and the lactose crystals removed by conventional methods such as hydraulic or centrifugal separation or by employing a filter or a screen reel. The amount of lactose removed in step 11 may amount to from 30 to 70 percent (40 to 60 preferred) of lactose present. However, in some instances and with special procedures as hereinafter described, from 79 to 85 percent of the original lactose content may be removed. It will be evident that the removal of lactose may be carried out in a separate plant for the manufacturing of lactose, thus providing a partially delactosed whey suitable for further processing, according to the present invention.

The partially delactosed whey retains some lactose in solution and some lactose in the form of relatively small crystals. In step 12 the whey is subjected to centrifuging or screening for removal of the major portion of such small crystals. IN step 13 the partially delactosed whey is subjected to heat treatment to a temperature level of from 110° to 120° F. to eliminate any residual lactose crystals.

In step 14 the liquid material is subjected to clarification, as, for example, by treating it in a centrifugal clarifier. Clarification is carried out at this point to remove insoluble material present, particularly insoluble protein or curd fragments. Assuming use of high heat cottage cheese whey, the liquid material may in a typical instance have a pH of from 3.8 to 4.2. Substantially the same pH limits are applicable to low heat cottage cheese whey. Cheddar cheese whey at this point may range to pH 4.5 for sour or acid whey and to 6.0 for sweet whey. The next step 15 is to subject the liquid material to electrodialysis. The equipment used for this purpose may be a plurality of membrane stacks connected in series with the whey flowing through ducts concurrently to a brine stream. Suitable equipment of this type is manufactured by Ionics, Inc. (see U.S. Pat. Nos. 2,730,768; 2,731,411, and 2,800,445). I can advantageously utilize the electrodialysis method and equipment disclosed in copending application Ser. No. 404,658, filed Oct. 19, 1964, now U.S. Pat. No. 3,544,436.

The electrodialyzing operation should be controlled with respect to pH, percentage of solids, and temperature, to avoid precipitation of protein, gelation or lactose crystallization throughout electrodialysis. Thus when the source material is high or low heat cottage cheese whey, the liquid at the beginning of the electrodialyzing treatment should be maintained between pH 3.9 to 4.2, the solids concentration should not exceed about 33 percent, aNd the temperature should not exceed about 110° F. As previously stated, the pH of sour cheddar cheese whey at this point may range to 4.5, and sweet wheys to 6.5, so that the overall range for cheese wheys is from 3.9 to 6.5. The treatment of a batch should be continued to produce the desired reduction in ash content. To produce a product of the type that I desire, it is preferable to carry out electrodialysis to reduce the ash content from about 20 to 55 percent.

Some wheys are more critical than others with respect to precipitation of protein and gelation. Thus the protein of cottage cheese whey tends to be critical at pH values at or near the isoelectric point (e.g., from 4.2 to 4.65), whereas the protein of cheddar cheese whey is not so critical in this respect. Therefore in the processing of cottage cheese wheys the pH is controlled whereby the processing steps, including electrodialysis, are carried out within a pH range that is either below or above 4.2 to 4.65. Generally it is deemed desirable to process sour cottage cheese whey within the previous specified range of from pH 3.9 to 4.2, because this minimizes or makes unnecessary the use of neutralizing chemicals. It may be pointed out in this connection that any chemical added for pH adjustment before electrodialysis serves to increase the mineral content. For the same reason, neutralized sweet cottage cheese whey preferably is processed at a pH above the isoelectric point, and within a range of the order of 4.65 to 6.5. Since cheddar cheese whey tends to be less critical with respect to precipitation of protein and gelation, the processing of such whey may be carried out within the general range of 3.9 to 6.5, but preferably at values which minimize or make unnecessary the use of added chemical.

The electrodialyzed material from step 15 is subjected to treatment to convert it to a discrete dry product. Preferably, this involves concentration in step 16 as by vacuum evaporation, followed by spray drying in step 17. Immediately prior to concentration, the material may be neutralized, as by the introduction of a suitable neutralizing chemical (e.g., lime), to adjust the pH slightly upward toward neutrality. Concentration may be from 50 to 55 percent solids.

Spray drying in step 17 can be carried out by the use of conventional spray drying equipment wherein the liquid concentrate is atomized in a chamber where the atomized particles are dispersed in a drying gas (see U.S. Pat. No. 2,088,606). Preferably, the drying conditions maintained are such that the divided product discharge from the drying chamber has a moisture content of the order of from 12 to H18 percent. This moist discrete material is then subjected to secondary drying as, for example, the use of conventional tunnel dryers or dryers of the shaker type. The final product preferably has a moisture content of the order of from 6.0 to 8.0 percent. Such a method is disclosed in U.S. Pat. No. 2,088,606.

A desirable feature of my process is that the ratio of combined mass of sodium and potassium to the mass of calcium in the product is reduced markedly when compared with the source material before dialysis.

The following table No. I gives analysis for a typical high heat cottage cheese whey which has previously been partially delactosed and then demineralized to the 20 and 50 levels.

TABLE NO. I.—TYPICAL ANALYSIS

| | Partially delactosed cottage cheese whey | | | | | |
|---|---|---|---|---|---|---|
| | Approximately 20% demineralized | | | Approximately 50% demineralized | | |
| | Before demin. | After demin. | After drying | Before demin. | After demin. | After drying |
| Lot No. | | | SD527 | | | SB510 |
| Lactose | 44.22 | 46.41 | 42.57 | 42.80 | 52.56 | 48.10 |
| Protein | 21.95 | 23.07 | 18.34 | 17.93 | 23.02 | 20.07 |
| Ash | 17.08 | 13.75 | 16.17 | 17.09 | 8.27 | 10.05 |
| Acidity | 17.37 | 17.41 | 6.60 | 18.40 | 10.80 | 6.45 |
| pH | 3.8 | 3.8 | 5.25 | 3.9 | 4.1 | 4.85 |
| Solids | 30.62 | 29.52 | | 29.79 | 28.54 | |
| Moisture | (¹) | (¹) | 7.30 | (¹) | (¹) | 7.80 |

¹ Moisture free basis.

The following table No. II includes the same date as in table No. I for a typical high heat cheddar cheese whey.

TABLE NO. II.—TYPICAL ANALYSIS

| | Partially delactosed cheddar cheese whey | | | | | |
|---|---|---|---|---|---|---|
| | Approximately 20% demineralized | | | Approximately 40% demineralized | | |
| | Before demin. | After demin. | After drying | Before demin. | After demin. | After drying |
| Lot No. | | | SE506 | | | SE505 |
| Lactose | 46.37 | | 44.67 | 46.37 | | 48.10 |
| Protein | 22.52 | | 21.43 | 22.52 | | 21.84 |
| Ash | 17.45 | 13.73 | 14.33 | 17.45 | 9.45 | 11.97 |
| Acidity | 9.6 | 9.1 | 6.5 | 9.6 | 9.45 | 6.3 |
| pH | 4.6 | 4.45 | 5.35 | 4.6 | 4.6 | 5.32 |
| Solids | 32.37 | 28.0 | | 32.37 | 27.5 | |
| Moisture | (¹) | (¹) | 8.40 | (¹) | (¹) | 7.20 |

¹ Moisture free basis.

In the above tables Nos. I and II the data under the heading "Before Demin." has reference to whey treated in accordance with the previously described flow sheet preparatory to electrodialysis in step 15. The data under the heading "After Drying" is for the dry discrete material after being partially neutralized and then converted to a dry product in the manner previously described, namely by spray drying with a moisture content of 12 to 18 percent, followed by secondary drying to reduce the moisture content to about 6.0 to 8.0 percent. Partial neutralization before drying was carried out by introducing calcium hydroxide in the amount necessary to adjust the hydrogen ion concentration to pH 5.0 to pH 5.5.

The following table No. III gives further analyses with respect to the mineral composition of a partially delactosed high heat cottage cheese whey before and after demineralization to the 20 and 50 percent levels.

TABLE NO. III.—MINERAL COMPOSITION OF PARTIALLY DELACTOSED COTTAGE CHEESE WHEY BEFORE AND AFTER DEMINERALIZATION BY ELECTRODIALYSIS AT TWO LEVELS OF DEMINERALIZATION

| | 20% demineralization | | | 50% demineralization | | |
|---|---|---|---|---|---|---|
| | Before demin. | After demin. | Percent change | Before demin. | After demin. | Percent change |
| Total ash (550° C.) | 17.05 | 13.05 | −23.5 | 17.4 | 7.75 | −55.4 |
| Calcium | 0.83 | 0.865 | +4.2 | 0.725 | 1.06 | +46.2 |
| Magnesium | 0.088 | 0.088 | 0.0 | 0.0973 | 0.119 | +22.3 |
| Potassium | 2.08 | 1.06 | −49.0 | 3.18 | 0.0575 | −98.2 |

Table III—Continued

| | | | | | | |
|---|---|---|---|---|---|---|
| Sodium | 1.40 | 0.75 | −46.4 | 1.22 | 0.0813 | −93.3 |
| Phosphorus | 1.55 | 1.32 | −14.8 | 1.08 | 0.967 | −10.5 |
| Chloride | 2.02 | 0.86 | −57.5 | 4.30 | 0.151 | −93.3 |
| Lactate [1] | 13.91 | 5.93 | −57.3 | 9.73 | 3.33 | −65.8 |
| Citrate [2] | 0.33 | 0.32 | | 1.64 | 2.38 | +45.1 |
| Titratable acidity as lactic acid | 17.4 | 17.4 | | 18.4 | 10.8 | |
| Total solids | 28.1 | 27.1 | −4.2 | 28.70 | 27.2 | −5.5 |

[1] As lactic acid.
[2] As citric acid.

Note.—All analysis dry basis.

It will be noted from table III that the process effected a net increase in the percentage of calcium present in the residual mineral content. However, with respect to the sodium content of the residual mineral content, the table shows a substantial decrease. This characteristic of the process applies to the treatment of either high or low heat wheys.

The mineral composition of the final product, shown by table No. III, is a desirable characteristic. In many instances, such as for infant foods, it is desirable to have a lowered content of sodium and potassium compared to the content of calcium. In addition to its novel mineral composition the dry product is a relatively free-flowing hydrate power, having a particle size such that the majority passes through a 20-mesh screen but remains on a 450-mesh screen. It does not cake when exposed to the atmosphere and it has good keeping properties, without browning. The calcium content of the ash of partially delactosed whey tends to be appreciably lower than that of the same whey before crystallization of the lactose and harvesting of the lactose therefrom. The reasons are as follows:

The concentration of the whole whey to a solids level of 50 to 60 percent, in addition to concentrating the lactose, does so to all other constituents including calcium and citric acid. The latter components are concentrated to such an extent that the limit of solubility of calcium citrate is exceeded to a substantial degree. As a result some calcium citrate is removed from solution in crystalline form and accompanies the mass of the crystalline lactose as it is separated physically from the mother liquor by screening, centrifuging, decantation or similar means. The percent of calcium in the ash may thus approach 4–6 percent instead of the level of about 9.0 percent quite generally found in standard wheys of different origins. The data in table III show calcium levels in two different batches of partially delactosed cottage cheese whey, before electrodialysis, to be 4.8 percent of the total ash in one instance and 4.1 percent in the second. If no removal of calcium as citrate had taken place, the levels would have been in the order of 8.5 percent. Very important, however, is the mass ratio of Na+ and K+ to Ca present. In the ash of approximately 40 percent delactosed whey, before electrodialysis, this ratio of (Na$^+$+K$^+$) to Ca is about 4:1, showing excessive preponderance of the Na+ and K+ ions over Ca, the latter being valuable in any ingredient to be used as a component of foods and feeds. Upon subjecting the material to electrodialysis to remove about 20 percent of the ash, a remarkable shift in ratio of (Na$^+$+K$^+$) to Ca takes place, so that a ratio of 2.0:1, instead of 4:1, results. The valuable calcium ion is removed at a slower rate than Na+ and K+ which, at their original levels, cause severe limitations on the usefulness of the product as a component in foods and feeds.

In the instance of 50 percent demineralization, the shift in ratio of (Na$^+$+K$^+$) to Ca is still more remarkable. At the start of electrodialysis, the ratio is 6:1, but after about 55 percent demineralization, the ratio is 1:6. It will be noted that, even though some calcium is electrodialyzed in the range of 20 to 55 percent demineralization, the actual calcium level in the end product tends to increase rather than decrease, enhancing the end product as a source of nutritionally important calcium. This is occasioned by the fact that sodium, potassium and chloride ions, together, are originally present in high levels and are preferentially removed at such a high rate that product solids decrease faster than calcium ion decreases in the product. These changes in ratios are set forth in the following table IV, derived from table III.

TABLE IV.—MASS RATIOS OF (Na$^+$+K$^+$) TO Ca IN PARTIALLY-DELACTOSED COTTAGE CHEESE WHEY AT APPROXIMATELY 20% AND 50% LEVELS OF DEMINERALIZATION THROUGH ELECTRODIALYSIS

| | 20% demineralization | | 50% demineralization | |
|---|---|---|---|---|
| | Before demin. | After demin. | Before demin. | After demin. |
| Total ash, percent | 17.05 | 13.05 | 17.4 | 7.75 |
| Ca in ash, percent | 4.87 | 6.6 | 4.1 | 13.6 |
| Na+, percent | 8.2 | 5.7 | 7.0 | 1.05 |
| K+, percent | 12.2 | 8.1 | 18.0 | 0.74 |
| Na++K+, percent | 20.4 | 13.8 | 25.0 | 1.79 |
| Ratio: Na++K+/Ca | 4:1 | 2:1 | 6:1 | 1:6 |

Processing as in the present invention by means of combining electrodialysis and partial lactose removal from whey produces directly a product not produced before in terms of the favorable balance of monovalent cations to calcium in a product enriched in protein by the removal of substantial proportions of the lactose from the original whey product. Thus, a dry product is made containing approximately from 45 to 52 percent by weight of lactose and approximately 18–24 percent or more of protein, while at the same time having an ash content of not more than about 8 to 13 percent ash and having a calcium content of about 1.0 percent and with, at the same time, a combined sodium and potassium content not exceeding about 1.8 percent and a ratio in the ash between (Na$^+$+K$^+$) and Ca not to exceed approximately 2:1. In the product made by about 50 percent demineralization, the ratio of (Na$^+$+K$^+$) to Ca will be approximately 1:6 while essentially preserving or enhancing the actual calcium content characteristic of the starting material.

In general, my process has a number of advantages over prior processes for reducing the ash content of whey. Particularly, it makes possible the economical application of electrodialysis without clogging or serious fouling of the membranes or flow channels. The process is applicable to both high and low heat wheys. It makes possible the economical production of edible food products that are relatively high in protein and which can be used as such as a food for human consumption or blended with other materials. The relatively low sodium content is a desirable feature of the product because it permits the use in instances where high sodium content would be deleterious. At the same time, the above product characteristics are provided together with total mineral content levels in a range generally found more desirable from the standpoint of general nutritional or organoleptic acceptability.

A feature of my process is that it provides a liquid concentrate that has good drying characteristics. It may be explained that both high and low heat delactosed wheys without demineralization are difficult to convert to dry powered products by spray drying. Particularly, spray-drying equipment operating on such material tends to be unstable and critical in its control, and the material tends to form sticky masses instead of the desired particles. By demineralization to the levels specified, changes occur which are not clearly understood, but which impart good drying characteristics, thereby making it possible to spray-dry the material in the manner previously described, with formation of the described discrete hydrate particles and without critical control factors.

In addition of the properties referred to above, the final dry product has physico chemical resistance to caking. Thus it may be stored and marketed in various types of packages without caking. It is relatively non-hygroscopic with respect to atmospheric moisture, and therefore it can be stored and marketed in containers that are not hermetically sealed. Because of the manner in which the material is spray-dried as a hydrate, the lactose content is in the form of alpha lactose monohydrate. A further characteristic of the final product is that is has good keeping properties, having reference particularly to flavor changes and resistance to discoloration or browning.

The foregoing assumes that processing includes conversion of the delactosed and demineralized concentrate to dry form. However, in some instances it may be convenient to sell the concentrate from step 15 or after further concentration in step 16 without further processing. Purchasers of such material may add it to other ingredients in the manufacture of various formulated products, and the products or such formulating operations may be in liquid or dry form. For example, the customer may mix the concentrate with dry fibrous discrete material such as rice hull or bran, after which the distance material is air dried, or a low heat delactosed and demineralized concentrate may be blended with other liquid materials to form an infant food.

Specific examples of my method and product are as follows:
High heat raw cottage cheese whey at pH 4.2 was concentrated to 54 percent solids and lactose permitted to crystallize. The larger lactose crystals were removed by the use of a reel in the manner disclosed in U.S. Pat. No. 2,768,912. The resulting concentrate at about 80° F. was then subjected to centrifuging for removal of a sludge containing smaller lactose crystals. The concentrate after such centrifuging comprised whey from which 55 percent of the original lactose content had been removed. This delactosed whey was then heated to 120° F. and held at this temperature for a period of 30 minutes. This served to dissolve remaining small lactose crystals. The liquid material was then subjected to clarifying treatment by passing it through a centrifuge, namely a DeLaval BRPX-309 self-opening clarifier. This served to remove suspended protein solids of the type that can be removed by application of centrifugal forces of the order of 4000 to 5000 times gravity. The material at that time had a hydrogen ion concentration of pH 4.0, and a solids concentration of 28.7 percent. This material was then electrodialyzed in a four stack demineralizing plant (Ionics, Inc.) in a conventional manner. The electrodialyzing operation was controlled with respect to voltage and current to prevent overheating (e.g. above 100° F.) with resulting precipitation of protein or gelation. During this treatment the pH was within the range of 4.0 to d.5. Electrodialysis was continued to effect substantially 50 percent demineralization. The electrodialyzed material, at pH 4.5 was then partially neutralized by the addition of small amounts of calcium hydroxide to pH 5.0, concentrated to 50 percent solids by vacuum evaporation, and then converted to a dry powdered material by use of drying equipment as previously described, namely a conventional hydrate-type spray dryer together with a secondary dryer.

Analyses before and after demineralization were substantially as shown in tables I and II. The material obtained was readily amenable to spray drying to form a stable, free-flowing hydrate product. In general, this product was resistant to caking and had good keeping properties without developing discoloration. It was a high protein product well suited for human consumption.

EXAMPLE NO. II

The same cottage cheese whey was employed as in Example No. I and was treated in the same manner for the removal of lactose and for the removal of fine lactose crystals and insoluble protein. However, instead of carrying out demineralization to the 50 percent level, it is demineralized to the 20 percent level, the material after demineralization having a pH of 3.8. Thereafter it was partially neutralized by addition of lime and dried by spray drying to form the desired powdered product. Analyses before and after demineralization were substantially as shown in tables I and III. This material, likewise, had good drying characteristics, and after spray drying the product obtained was resistant to caking and had good keeping properties, without developing discoloration.

EXAMPLE NO. III

The raw material was high heat cheddar cheese whey, rather than cottage cheese whey. The whey at pH 5.0 was concentrated to 55 percent solids, and lactose permitted to crystallize. The larger lactose crystals were removed in the same manner as in example I. The resulting concentrate at about 80° F. was then subjected to centrifuging for removal of a sludge containing smaller lactose crystals. The concentrate after such centrifuging comprised whey from which 55 percent of the original lactose content had been removed. This delactosed whey was then heated to 120° F. and held at this temperature for a period of 30 minutes. This served to dissolve small remaining lactose crystals. The liquid material was then subjected to clarifying treatment by passing it through a centrifuge, namely, the same DeLaval BRPX-209, used in example I. This served to remove suspended protein solids in the same manner as in example I. The material at this time was at pH 4.5, with a solids concentration of 28.7 percent. This material was then electrodialyzed in the same manner as in example I, with the electrodialyzing operation controlled with respect to voltage and current to prevent overheating (e.g. above 100° F.), which would have resulted in precipitation of protein or gelation. During electrodialyzing, the pH was in the range of 4.5 to 4.6. Electrodialysis was continued to effect substantially 40 percent demineralization. The electrodialyzed material at Ph 4.6 was then partially neutralized by the addition of small amounts of calcium hydroxide to pH 5.0, concentrated to 50 percent solids by vacuum evaporation, and then converted to a dry powdered material by use of drying equipment as in example I. Analyses before and after demineralization was substantially as shown in table II, and the mineral composition was comparable to table No. III. Here again, the material obtained had good drying characteristics and, in general, had the properties described in example I.

EXAMPLE NO. IV

The same procedure was followed as in example III, employing cheddar cheese whey but electrodialyzing to the 20 percent level. After electrodialyzing, the material had a pH of 4.5. This electrodialyzed material was then concentrated to 50 percent solids by vacuum evaporation, and converted to a dry power in the same manner as in example I. Here again, the material had good drying characteristics and gave a final product of the type described in connection with example I.

EXAMPLE NO. V

This example pertains to the treatment of low heat whey. Raw cottage cheese whey at pH 4.2 was preheated to about 155° F. and held at this temperature for about 20 seconds. It was then by passing it through four effects of a vacuum evaporator of the Peebles type, the shells of the four effects having temperatures of 162° F., 134° F., 128° F., and 118° F., respectively. The concentrate was delivered from the last effect at a temperature of 115° F. and at 53.5 percent solids. The lactose was permitted to crystallize in conventional crystallizing apparatus. The larger lactose crystals were removed by use of a reel as specified in example I. The resulting concentrate at about 80° F. was then subjected to centrifuging for removal of a sludge containing smaller lactose crystals. The concentrate after such centrifuging comprised whey from which 55 percent of the original lactose content had been removed. This delactosed whey was then heated to 120° F. and held at this temperature for a period of 30 minutes to dissolve the remaining small lactose crystals. The liquid material was then subjected to clarifying treatment as in example I by passing it through a DeLaval BRPX-309 self-opening clarifier to remove suspended protein solids. The material at that time had a hydrogen ion concentration of pH 4.1 and a solids concentration of 26.1. This material was electrodialyzed in the same manner as specified in example I. During the electrodialyzing the pH was within the range of 3.9 to 4.6. Electrodialysis was continued to effect an ash reduction of 17.3, 38.0, 45.6, and 52.3 percent for samples taken at different periods. All samples were partially neutralized by addition of small amounts of calcium hydroxide, to pH 5.2. The samples were then concentrated to about 47 percent solids by vacuum evaporation and converted to dry powdered materials by use of spray drying equipment as previously described in example I.

Analyses before and after demineralization were comparable with tables I and II. The electrodialyzed concentrate was readily amenable to spray drying to form a stable free-flowing hydrate powder. The product was resistant to caking and had good keeping properties without developing discoloration. The protein content of the product, because of its substantially undernatured character, was well suited to special dietetic purposes, such as in infant foods.

EXAMPLE VI

This example pertains to the treatment of low heat sweet edible cheddar cheese whey. The raw whey at pH 6.2 was preheated to about 164° F. for a period of about 15 seconds and then passed through a vacuum evaporator having jacket temperatures of 175° F., 158° F. and 135° F. for the first, second and third effects. The evacuating equipment employed was one of the Peebles downdraft type. Vacuum evaporation produced a concentrate of 26.91 percent total solids which was removed from the last effect at 112° F. Hydrogen peroxide was added to the concentrate at a level of 270 p.p.m. to ensure sterilization. After a holding time of about 3 hours the concentrate was subjected to further vacuum evaporation which involved rapidly preheating to 140° F. and then immediately passing the concentrate through one vacuum evaporating effect having a jacket temperature of 150° F., the concentrate being removed at 112° F. at a concentration of 49.83 percent total solids. The concentrate was then transferred to a ribbon mixer which was employed as a crystallizer. The agitator of the mixer was started after the mixer was filled with the concentrate and after a short cooling period. Thereafter the concentrate was cooled gradually over a period of 10 hours over a temperature gradient ranging from 110° to 83° F. 10½ hours after filling the crystallizer, the entire mass was delivered to a basket centrifuge. The basket of this centrifuge had been precoated with coarse crude lactose hydrate. The purpose of the precoat was to effect removal of a substantial amount of fine lactose crystals together with the coarser crystals. The resulting concentrate at about 80° F. was then heated to 100° F. and sodium hydroxide added to adjust the pH to 6.2. It was then subjected to centrifuging in a BRPX-309 DeLaval Clarifier to effect clarification and removal of remaining fine lactose crystals. The concentrate after such centrifuging comprises whey from which about 40 percent of the original lactose content had been removed. Quantities of this concentrate were successfully subjected to electrodialysis in the same manner as in example I, to effect demineralization to various levels ranging between 15 to 55 percent. During demineralization the pH of the whey was within the range of pH 4.7 to 6.5.

In the foregoing description the invention has been described with reference to the treatment of certain high and low heat cheese wheys (i.e., cheddar and cottage cheese); however, the invention is deemed applicable to other rennet cheese wheys such as swiss, Edam, jack cheese, and the like resembling closely the whey from cheddar cheese manufacture. Likewise, the cottage cheese whey is deemed to be an example applicable to other acid wheys such as soured rennet cheese wheys as well as those wheys resulting from cottage cheese or casein manufacturing through the use of either lactic acid or food grade mineral acids such as hydrochloric or sulfuric acid to remove the casein from nonfat milk.

In the foregoing description, reference has been made to the use of delactosed whey concentrate obtained by concentrating whey to from 50 to 60 percent solids followed by removal of from 30 to 70 percent of the original lactose content. The present invention is also applicable where the delactosed whey concentrate is one obtained by known methods which may remove from 70 to 85 percent of the original lactose content. Such methods may consist merely of a second concentration step followed by a second crystillization and harvesting treatment, or simultaneous concentration and crystallization, followed by conventional harvesting. Another known method may concentrate the whey to form 60 to 70 percent solids after neutralization to pH 6 and addition of a phosphate protein stabilizer. In general, the delactosed whey concentrate obtained by such methods can be treated in the same manner as described with reference to FIG. 1. The analysis of the ash content of the final product is somewhat modified when the phosphate stabilizer is employed in that it reflects the addition of mineral for neutralization and stabilization.

As an example of my invention where 70-85 percent of the lactose content is removed from the whey, fresh cheddar cheese whey can be concentrated and lactose crystallized as in example III, followed by harvesting of the lactose crystallized as in example 1, yielding about 55 percent of the original lactose in the whey. Reconcentration of the resulting whey to 55 percent solids, followed by crystallization and harvesting as before provides a combined yield of cured lactose of 80 percent of the original lactose content. The resulting concentrate can be adjusted to 28 percent total solids, heated to 120° F., held at that temperature for 20 minutes to dissolve any remaining lactose crystals, and clarified as in example I. The clarified concentrate is then electrodialyzed as in example I, except that electrodialysis can be carried out to effect about 45 percent demineralization. The resulting concentrate can be adjusted to pH 5.0 with addition of lime, concentrated to 50 percent solids by vacuum evaporation, and then spray dried. A typical analysis of a final dry product obtained in this manner is as follows:

| Lactose | 43.0% |
|---------|-------|
| Protein | 33.% |
| Ash | 11.5% |
| Moisture | 7.2% |

The ash content of such a typical product can be essentially as in example III.

In the embodiment and example just described, reference has been made to treatment of cheddar cheese whey. The embodiment is similarly applicable to the treatment of high heat cottage cheese whey. For example, high heat fluid cottage cheese whey at pH 4.2 can be processed as in example I through the steps of evaporation, crystallization and lactose harvesting. At this point, a second stage of evaporation, crystallization and harvesting can be carried out whereby a total of 80 percent of the original lactose content is removed. The resulting concentrate can then be electrodialyzed after heating and clarified as in example I. Electrodialysis can be carried out to the extent of about 45 percent demineralization. After adjusting the pH upward to about 5, with addition of a small amount of calcium hydroxide, the concentrate can be further evaporated to 50 percent solids and spray dried, as in example I. A typical product produced in this manner may analyze as follows:

| | |
|---|---|
| Lactose | 43.5% |
| Protein | 36.0% |
| Ash | 12.0% |
| Moisture | 7.5% |

With respect to removal of lactose by concentration and crystallization utilizing a phosphate protein stabilizer, the whey may be processed as disclosed in U.S. Pat. No. 2,467,453, with concentration of the whey to from 60–70 percent solids in the presence of a chemical stabilizer to protect the protein against heat denaturation. For example, fluid whey with a titratable acidity of 0.13 percent as lactic acid can be treated with sodium hydroxide to adjust the pH to 7.02. Sufficient protein stabilizer, namely quadrofos ($Na_6P_4O_{13}$) can be added to provide a concentration of 0.004 percent of the fluid whey. Heating, evaporation, crystallizing and crystal harvesting can be carried out substantially as disclosed in U.S. Pat. No. 2,467,453 to produce a yield of 76 percent of the original lactose of the whey. The remaining mother liquor, containing 28 percent solids, can be heated to 115° F. to dissolve residual crystals and centrifugally clarified. The pH preferably is adjusted to 6.4 with hydrochloric acid, and the this concentrate electrodialyzed at a temperature of 102°–107° F. to remove 40 percent of the ash. Preferably during electrodialysis concentrate can be further concentrated by evaporation to 50 percent total solids and they spray dried as in example I. The resulting product may analyze 43.3 percent lactose, 31.3 percent protein, and 10.4 percent ash (bone dry basis). The composition of the ash may correspond to that of table III, except that the sodium and phosphorus contents reflect the additions of these elements to provide chemical stabilization of the proteins to heat.

I claim:

1. In a method for the treatment of whey selected from the group consisting of cheddar cheese, whey, sour cottage cheese whey and neutralized sweet cottage cheese whey for the manufacture of a food product, the steps of concentrating the whey to a solids content of at least about 50 percent to effect crystallization of lactose, removing lactose crystals from the whey, heating the whey to a temperature level of from 110° to 120° F. to eliminate residual lactose crystals, clarifying the liquid material with removal of insoluble protein and curd fragments, and then subjecting the clarified liquid at a pH from 3.9 to 6.5 for Cheddar cheese whey, from 3.9 to 4.2 for cottage cheese whey, and from 4.65 to 6.5 for neutralized sweet cottage cheese whey to electrodialysis to effect a substantial reduction in ash content of from about 20 to 55 percent, the concentrate as subjected to electrodialysis having a solids content not in excess of about 33 percent.

2. A method as in claim 1 in which lactose is removed from the whey by first removing the larger lactose crystals and then centrifuging the whey to remove a sludge containing smaller lactose crystals.

3. In a method for the treatment of whey selected from the group consisting of Cheddar cheese whey, sour cottage cheese whey and neutralized sweet cottage whey, for the manufacture of a food product, the steps of concentrating the whey to a solids content of at least about 50 percent to effect crystallization of lactose, removing the larger lactose crystals from the whey, subjecting the whey to centrifuging for the removal of smaller lactose crystals, heating the whey to a temperature level of from 110° to 120° F. to eliminate residual lactose crystals, clarifying the liquid material with removal of insoluble protein and curd fragments, subjecting the clarified liquid at a pH from 3.9 to 6.5 for Cheddar cheese whey, from 3.9 to 4.2 for cottage cheese whey, and from 4.65 to 6.5 for neutralized sweet cottage cheese whey to electrodialysis to effect a substantial reduction in ash content of from 20 to 55 percent, the concentrate as subjected to electrodialysis having a solids content not in excess of about 33 percent, concentrating the electrodialyzed material and then subjecting the concentrate to spray drying to produce a discrete dry product.

* * * * *